Nov. 19, 1957 S. HANSEN 2,813,481

RECORD-IMPRESSING APPARATUS

Filed Aug. 18, 1954 4 Sheets-Sheet 1

INVENTOR.
SIEGFRIED HANSEN,
BY
Henry Heyman
ATTORNEY.

INVENTOR.
SIEGFRIED HANSEN.
BY
Henry Hyman
ATTORNEY.

RECORD-IMPRESSING APPARATUS

Filed Aug. 18, 1954 4 Sheets-Sheet 3

INVENTOR.
SIEGFRIED HANSEN,
BY Henry Hyman
ATTORNEY.

Nov. 19, 1957 S. HANSEN 2,813,481

RECORD-IMPRESSING APPARATUS

Filed Aug. 18, 1954 4 Sheets-Sheet 4

SIEGFRIED HANSEN,
INVENTOR

BY Henry Heyman
ATTORNEY 2,813,481

RECORD-IMPRESSING APPARATUS

Siegfried Hansen, Los Angeles, Calif., assignor to Hughes Aircraft Company, Culver City, Calif., a corporation of Delaware Application August 18, 1954, Serial No. 450,773

9 Claims. (Cl. 101—93)

Figure 1A:
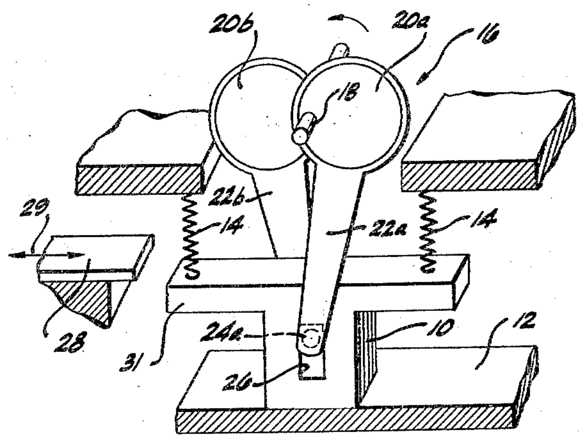

The present invention relates to record-impressing apparatus, and more particularly to a high-speed record-punching or printing apparatus, in which the reciprocating motions of a recording element, toward and away from a position of impact with a platen-supported record medium, correspond to a cycle of operation defined as the elastic rebound cycle.

Recent advances in the field of high-speed electronic data-processing machines have fostered a need for relatively high-speed record-impressing output devices to record processed intelligence permanently by punching or printing upon a rapidly moving record medium, such as a record card or tape. In the prior art, many record-impressing machines are known that utilize record-impressing elements, such as punch holders or printing hammers, which are driven against platen-supported record media to mark information indicia thereon. According to the basic concept of these prior-art devices, energy for the impression stroke of the element toward the platen is provided by a positive mechanical or electromechanical drive which engages the element at the beginning of the impression stroke and forces the element into contact with the record medium, while energy for the return stroke is provided by the springs which are deflected during the impression stroke to apply restoring forces to the element during its return stroke to return the element to a predetermined starting position. At least two basic types of prior-art devices embody the above-described principle of operation.

In the first type of prior-art device, the drive is maintained in operating engagement with the record-impressing element throughout the impression stroke and during impact upon the record, the impression element therefore remaining pressed in contact against the record until the drive is disengaged. In the second type of prior-art device, the drive is disengaged from the element at a fairly early time during the impression stroke, the element, in effect, being projected or batted against the platen-supported record medium in opposition to the restraining forces exerted upon the element by the return spring.

The first type of prior-art device, in particular, has several inherent disadvantages which limit its applicability for high-speed recording. For example, the operating efficiency of this type of device is relatively low, since the impressing element is positively pressed by the drive against the record at the moment of impact and any possible elastic rebound of the element from the platen is suppressed by the opposing drive forces. Accordingly, most of the kinetic energy communicated to the element is dissipated in the form of heat. Still another disadvantage of these prior-art devices is that severe vibrations and shocks are set up which are communicated to the drive structure and which tend to limit the permissible speed of operation of the device, this shock and vibration being caused both by the abrupt engagement of the drive with the element at the beginning of the impression stroke and by the impact of the drive-engaged element against the platen at the completion of the impression stroke.

Still a further disadvantage of the first type of prior-art devices is that it is very difficult to control the length of time throughout which the impressing element remains in contact with the record medium, owing to the fact that the contact time is prolonged until the drive is disengaged from the element, the total time of contact depending, to a considerable extent, on the mechanical tolerances maintained in the drive mechanism and in the coupling between the drive and the element. An optimum setting of contact time for these prior-art machines is unstable, tending to degrade rapidly as parts wear and tolerances change; and, therefore, in these prior-art machines contact times are established which are relatively long compared to the minimal contact times required for good impressions upon the record medium. As a result, good impressions are obtained only for relatively low velocities of a continuously moving record medium, impressions tending to become blurred and indistinct as the velocity of the record medium is increased.

The second, more advanced type of prior-art device, in which the element is projected or batted against the record medium, also has a number of disadvantages which limit its applicability in high-speed recording systems. In this second type of machine, as in the first type, excessive shock and vibration are communicated to the drive structure, these effects being largely caused by the abrupt engagement of the drive with the element at the beginning of the impression stroke. This second type of device is also relatively inefficient in its utilization of input energy, because of a fundamentally unfavorable feature of its design, namely, that after the element is projected or batted against the record medium, it is returned by its return action spring to a quiescent starting position at which the spring is undeflected. Since the operating principle calls for the element to be returned to this quiescent starting position, any kinetic energy retained by the element atfer rebound from the platen is not conserved for useful purposes, but is dissipated during the return stroke. Indeed, in order to obtain a return stroke of short duration, it is advisable to introduce appropriate damping deliberately to absorb the kinetic energy retained by the element as quickly as possible.

A further disadvantage of the second type of prior-art record-impressing apparatus is that the impression element strikes the platen with a substantially smaller velocity than the velocity imparted to it by the drive, because of the decelerating force exerted upon it by its associated return spring. Thus, in these prior-art devices, it has been necessary for the drive to engage the element abruptly with great force and at very high velocities in order for the element to have sufficient impact velocity. As a result, the drive and the impression element are severely stressed to an extent which limits the permissible speed of operation of these devices.

The present invention, on the other hand, overcomes the above and other disadvantages of the prior-art record-impressing devices by providing a high-speed record-impressing apparatus in which the reciprocating motions of the impression element are patterned after the motions of a spring-suspended mass or element undergoing free vibrations in accordance with an elastic rebound cycle. The term elastic rebound cycle as defined herein is descriptive of the motions of a spring-suspended element which is positioned adjacent another stationary mass and is given an initial displacement from its rest or quiescent position and allowed to vibrate freely, the stationary mass being positioned in the path of motion of the element, so that the element rebounds therefrom with an abrupt reversal of its motion at a position which corresponds to the maximum velocity of the element. If it is assumed that the rebound is properly directed, and that no energy is lost in the elastic collision between the element and the stationary mass, the element will be returned on the rebound to the initial displaced position. When the element is at this initial position, the spring, of course, is substantially deflected and exerts large forces upon the element, while at the position of the element corresponding to its impact at maximum velocity against the stationary mass, the spring is substantially undeflected and exerts very small forces, or no forces at all, upon the element. Thus, at impact, the spring does not exert forces to suppress the free elastic rebound of the element, and therefore, the kinetic energy of the element is conserved. During the return stroke of the element, this energy is transferred to the spring where it is stored for the performance of another cycle of operation.

According to the basic concept of the present invention, a high-speed record-impressing apparatus is provided for impressing indicia upon a record member which is moving at high velocity over the surface of a platen, in which the motions of a spring-suspended impression element are in close accordance with the elastic rebound cycle, the impression element being driven in extremely rapid reciprocating motions toward and away from a position at which the impression element strikes against a platen-supported record medium and rebounds therefrom. Substantially all of the kinetic energy communicated to the element for its impression stroke toward the platen is provided by an associated spring, while the energy for the return stroke of the element is provided both by the free elastic rebound of the element from the platen and by a mechanical drive which functions to assist in lifting the element on the return stroke away from the platen to a predetermined starting position, the drive thereby supplementing the kinetic energy retained by the element after its rebound from the platen.

Another important and advantageous feature of the present invention is that the drive does not strike against or collide with the element, but instead engages the element during the return stroke with a gentle pick-up motion, thereby greatly decreasing shock and vibration. As a result, stresses in the drive structure and in the element are greatly decreased, therefore allowing much higher operational speeds and longer useful life than was obtained with prior-art devices. In addition, owing to the fact that the element is unconstrained at the moment of impact, the duration of contact between element and platen is unaffected by wear in the drive mechanism. Accordingly, contact time does not change easily, and as a result, very short optimum contact times may be used which greatly facilitate high-speed operation. As an additional advantage, the basic record-impressing apparatus of the present invention may be readily adapted for parallel or serial operation of large arrays of impression elements.

According to several embodiments of the invention, the record-impressing apparatus of the present invention is adapted for operation in response to electrical signals, the impression element being normally retained in its initial starting position by a signal-responsive latch, and being actuable when the latch is released for the performance of a cycle of operation. As a preferred feature of the invention, the latch engages the element approximately at the completion of the return stroke at a time when the element has very low velocity and, therefore, does not damage the latch. As a result of this feature of operation, very light, fast-operating latch members may be employed, thus facilitating high-speed operation.

According to one embodiment of the invention, the drive unit includes two drive pins which perform identical simple harmonic motions in parallel paths, the motions of the pins being 180° out of phase with one another so that if one pin is descending toward the platen, the other pin is ascending away from the platen. The element is compelled by the associated spring to follow the motion of whichever pin is uppermost. The element, therefore, follows one pin down during the impression stroke and rebounds from the platen with the second pin trailing closely behind. Since the element loses some energy during collision with the platen, its absolute velocity during the return stroke is somewhat less than its velocity for equivalent positions during the impression stroke. Accordingly, at some time during the return stroke, the lagging element is engaged by the second pin and lifted up to the initial starting position. In this scheme of operation, the first pin functions to time and regulate the speed of descent of the element so that its rebound is correctly synchronized with the motion of the ascending drive pin.

A modified form of the invention utilizes two rotating eccentrics in its drive to replace the above-described drive pins, the eccentrics being mounted on a common drive shaft and positioned 180° out of phase with one another. The spring compels the element to follow the highest point on the two eccentrics, the element therefore following one eccentric down during the impression stroke and being picked up by the other eccentric during the return stroke.

Another modification of the invention utilizes a single rotating cam of preselected shape in its drive mechanism, the single cam performing the same major functions as are performed by the two drive pins or two eccentrics utilized in the above-described forms of the invention. A number of different cam shapes may be used in accordance with the basic principles of the invention. With at least one particular cam shape, a type of operation is obtained in which the element is completely out of contact with the drive throughout the impression stroke, timing and synchronization of the rebound being obtained by choosing the physical constants of spring and element so that the element vibrates at a frequency which closely matches the frequency of operation of the drive cam. With another preferred cam shape, extremely close frequency matching is not required because the element follows the cam during the impression stroke, the rebound of the element being timed by the cam in the same manner in which timing of the rebound was accomplished in several of the other embodiments of the invention.

It is, therefore, an object of the invention to provide a high-speed record-impressing apparatus in which an impression element is moved in accordance with the elastic rebound cycle, the element striking the platen at a time when the element has been accelerated to its maximum velocity, and freely rebounding therefrom.

It is another object of the invention to provide a high-speed record-impressing apparatus utilizing a spring-suspended impression element which has free elastic rebound from a platen, the energy retained by the element after rebound being transferred to the spring during the return stroke and stored therein for the performance of another cycle of operation.

It is still another object of the invention to provide a high-speed record-impressing apparatus in which energy for the recording stroke of an impression element is provided by a spring which drives the element toward a platen, while the energy for the return stroke of the element is provided both by a free elastic rebound of the element away from the platen and by a mechanical drive which assists in lifting the element during its return stroke.

It is yet another object of the invention to provide a high-speed record-impressing apparatus wherein a mechanical drive engages with the impression element at a very low relative velocity, the drive following the element during the return stroke and engaging the element with a gentle lifting motion.

It is a further object of the invention to provide a high-speed record-impressing apparatus in which an impression element is constrained by a spring to follow the motions of a mechanical drive during the impression stroke of the element, the motion of the element thereby being regulated and synchronized so as to facilitate a low-velocity synchronous engagement of the drive with the element during the return stroke.

Still a further object of the invention is to provide an apparatus which is responsive to electrical signals for the performance of high-speed record-impressing operations, the apparatus including a signal-responsive latch which engages a record impressing element as it attains the peak of its return stroke, at a time when the velocity of the element is very low.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Figure 1B:
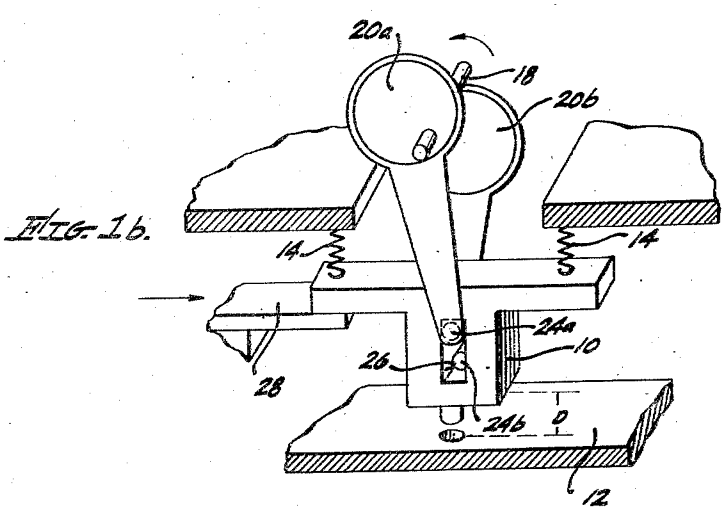
Figure 3:
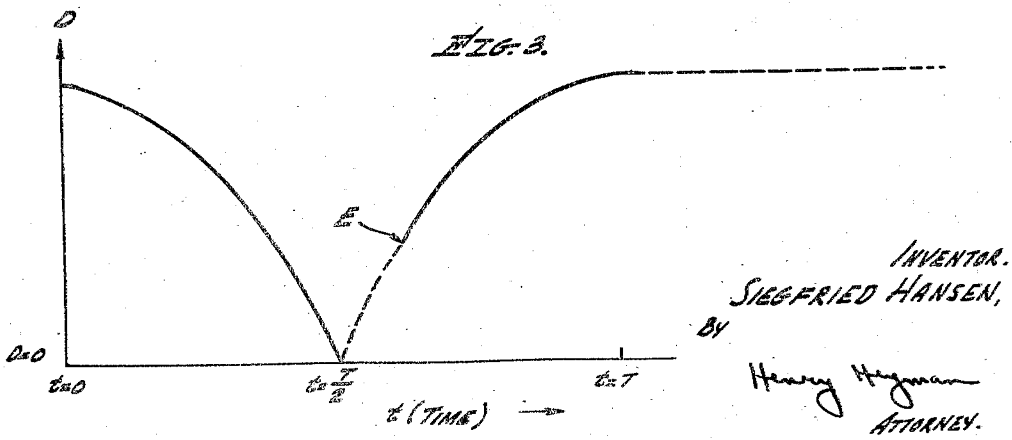
Figure 2D:
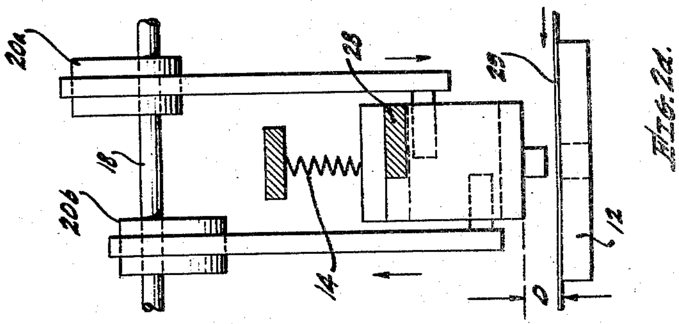
Figure 2C:
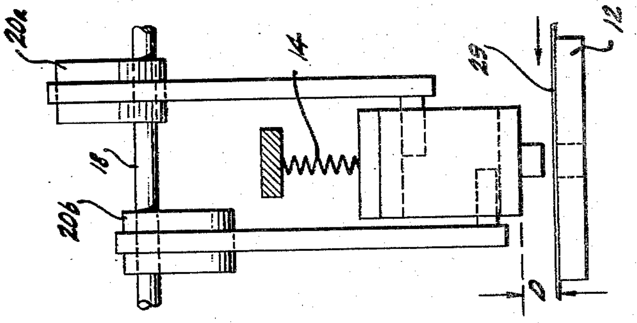
Figure 2B:
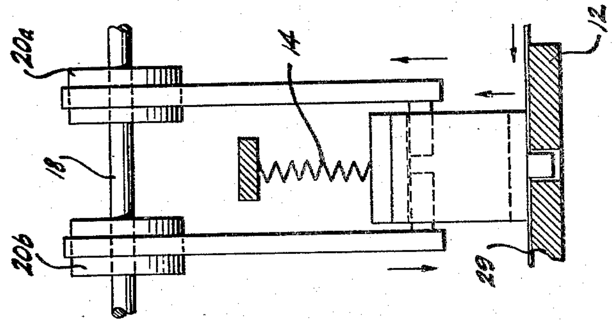
Figure 2A:
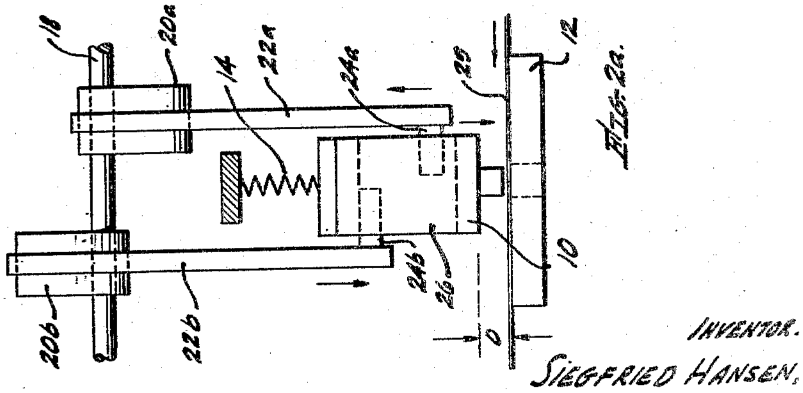
Figure 4A:
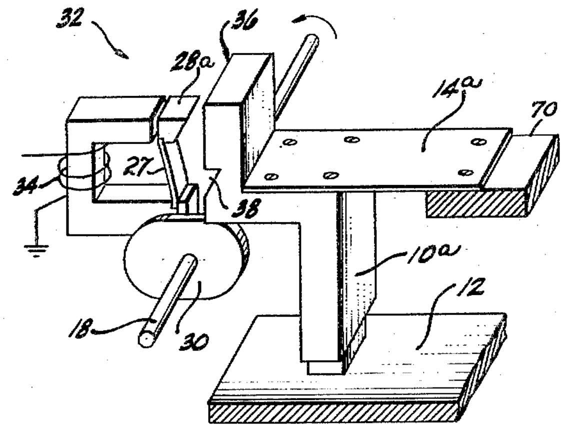
Figures 5A, 5B:
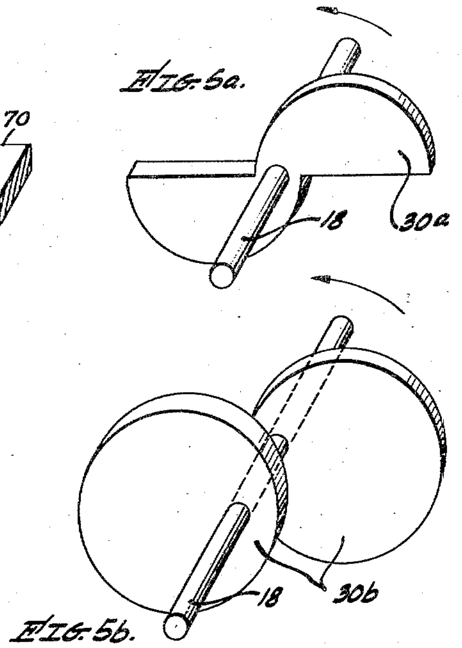
Figure 6A:
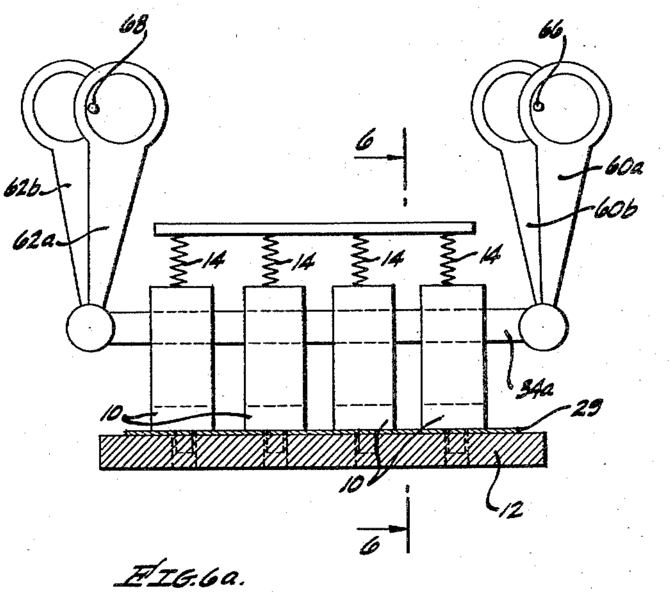
Figure 6B:
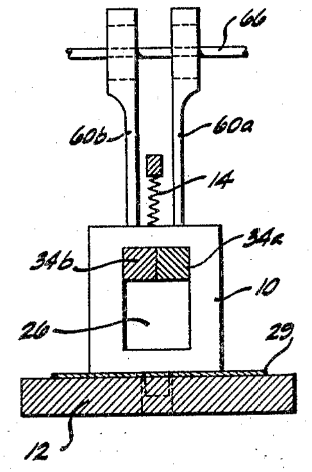
Figure 4B:
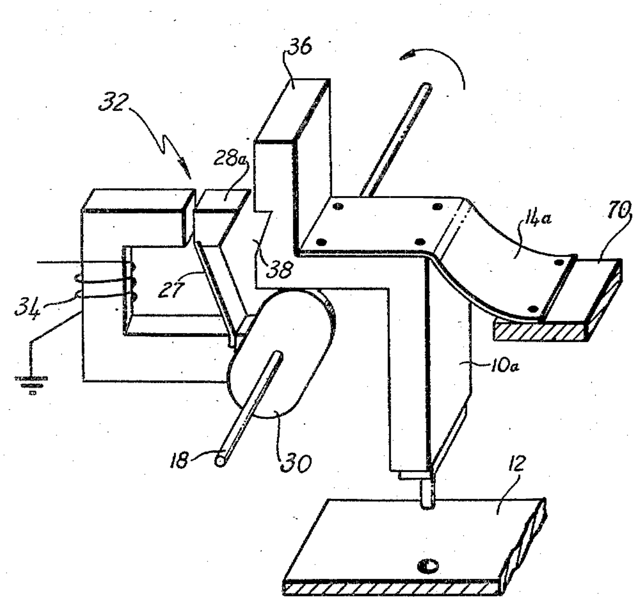

Fig. 1*a* is an isometric view of a record-punching apparatus, according to the present invention, showing the positions of the various elements of the punching apparatus as they appear at the moment when the punch element strikes against the platen;

Fig. 1*b* is another isometric view of the record-punching apparatus shown in Fig. 1*a* as it appears at a time when a latch member has engaged the punch element to hold the element in an inoperative position;

Figs. 2*a*–2*d* are four side views of the record-punching apparatus shown in Figs. 1*a* and 1*b*, illustrating in greater detail the cooperation of the punch element with the drive, Figs. 2*a*–2*c* showing the apparatus as it appears at three successive times during a single punch cycle and Fig. 2*d* depicting the apparatus in its latched condition;

Fig. 3 is a graph in which the displacement of the punch element relative to the platen is plotted as an ordinate against time as an abscissa for a single cycle of operation of the punching apparatus;

Fig. 4*a* is an isometric view of a signal-responsive printing apparatus, according to the invention, having a modified form of drive mechanism which employs a single rotatable cam for coupling the drive mechanism to the printing element;

Fig. 4*b* is an isometric view of the signal-responsive printing apparatus shown in Fig. 4*a* as it appears at a time when the printing element is substantially at its maximum distance from the surface of the platen;

Fig. 5*a* is an isometric view of another differently shaped rotatable cam which may be substituted for the cam utilized in the drive mechanism of the embodiment of the invention shown in Fig. 4;

Fig. 5*b* illustrates a pair of eccentrics which may also be substituted for the cam employed in the embodiment of the invention shown in Fig. 4;

Fig. 6*a* is a frontal view of a plurality of printing apparatus, according to the invention, combined in an array for the performance of multiple printing operations; and Fig. 6*b* is a sectional view, through the line 6—6, of the printing array shown in Fig. 6*a*.

Referring now to the drawings, wherein like reference characters designate like or corresponding parts throughout the several views, there is shown in Fig. 1*a* a preferred embodiment of a record-impressing apparatus, according to the invention, in which a spring-suspended punch element 10 is selectively actuable at an extremely high rate of speed for the performance of successive punching operations, in accordance with the elastic rebound cycle, upon a record card, not shown, which is supported upon the surface of a platen 12. Fig. 1*a* shows the position of the various elements of the punching apparatus as they appear at the moment when element 10 strikes against the platen. It will be understood that each punching operation of the apparatus includes a punch stroke in which element 10 is driven downward from a predetermined starting position toward impact with the surface of the platen and a return stroke in which element 10 rebounds upward away from the surface of the platen to return to its predetermined starting position. Element 10 is constrained by a guide, not shown, to perform its reciprocating motions in a path which is perpendicular to platen 12, and to align element 10 in a vertical position relative to the platen.

Substantially all of the kinetic energy communicated to element 10 for the performance of the punch stroke is provided by a pair of springs 14, these springs being coupled to element 10, so as to ordinarily apply to the element a resultant force directed towards the surface of the platen. When element 10 is at its initial starting position, springs 14 are substantially compressed and exert large forces upon the element which accelerate the element downward against the platen, the position of impact as shown in Fig. 1*a* corresponding to the maximum velocity of the element. In this position, springs 14 are substantially undeflected and exert very small forces, or no forces at all, upon the element.

It is clear, therefore, that at the instant of impact, the springs do not act either to return the element to its initial starting position or to suppress the free elastic rebound of the element from the platen. It is, in fact, the elastic rebound of the punch element from the platen, which provides most of the kinetic energy for the return stroke of element 10, this energy being transferred to the spring during the return stroke and stored therein for the performance of another cycle of operation. However, it is event that the vibratable mechanical system which includes the springs, punch element, and platen hereinbefore described is not one hundred percent efficient, and will lose some energy at each rebound of element 10 from platen 12. Accordingly, a mechanical drive, generally designated 16, is provided to restore lost energy to the system, this mechanical drive functioning principally to lift element 10 during the return stroke to return the element to its predetermined starting position, thereby supplementing the energy which is retained by the system after the elastic rebound of element 10 from platen 12.

As shown in the embodiment of Fig. 1*a*, mechanical drive 16 includes a continuously rotating shaft 18 which has a pair of eccentrics **20*a* and 20*b* fixedly mounted thereon, the eccentrics being positioned 180° out of phase with respect to each other and being coupled to punch element 10 through a corresponding pair of crank arms 22*a* and 22*b*, respectively, these crank arms having at their tips corresponding drive pins 24*a* and 24*b* which engage with a slot 26 which extends through punch element 10. Although drive pin 24*b*** is not visible in Fig. 1*a*, it being largely obscured in this view by drive pin **24*a***, it may be clearly distinguished in Fig. 1*b* and in Figs. 2*a*–2*d*.

In a typical punching operation, punch element 10 is urged downward by springs 14 so as to ordinarily maintain contact with whichever drive pin is uppermost. Drive pins **24*a* and 24*b* perform identical simple harmonic reciprocating motions in parallel paths defined by slot 26, the motions of the pins being in accordance with the motions communicated to their associated crank arms by eccentrics 20*a* and 20*b*. Thus, the reciprocating motions of the drive pins 24*a* and 24*b* are 180° out of phase with one another so that when one pin is descending toward the platen, the other pin is ascending away from the platen. Element 10**, therefore, follows one pin down during the punch stroke, and at the completion of the punch stroke rebounds away from the platen with the other rising pin trailing closely behind.

Since element 10 loses some energy during its collision with platen 12, the velocity of element 10 during its return stroke is somewhat less than its velocity for equivalent positions during the punching stroke; therefore, at some time during the return stroke the rising pin overtakes element 10, engages the element at a very low relative velocity, and, in the continuance of its rising stroke, assists in lifting element 10 to the initial starting position. It will be recognized that in the above-described cycle of operation, the descending pin functions to time and regulate the speed of descent of element 10 so that its rebound is correctly synchronized to facilitate a gentle engagement of the ascending drive pin with the punch element during the return stroke. Because of this feature of operation, close matching of frequency between the vibratable mechanical system and the drive is not required.

When element 10, at the completion of its return stroke, again reaches the initial starting position, it may be engaged by a latch member 28, shown in Fig. 1*a*, which is movable in the directions indicated by arrow 29, for engaging the lower surface of a flanged portion 31 of element 10, the latch member preventing element 10 from performing another punch stroke until latch member 28 is again withdrawn. It will be recognized, of course, that latch member 28 may be actuated by a great variety of different devices well known to those skilled in the art. Some description of a specific type of electrical signal-responsive actuating device will be provided hereinbelow in connection wtih discussion of certain other embodiments of the invention.

Referring now to Fig. 1*b*, there is shown a view of the record-impressing apparatus of the invention as it would appear at a time when latch member 28 has engaged element 10 to prevent further punching strokes of the element. Latch member 28, as shown in Fig. 1*b*, holds element 10 at an initial starting position which is adjacent or identical to the highest position reached by the element. At this initial starting position, the bottom face of element 10 is a distance D from platen 12, and springs 14 are compressed, the energy stored in these springs being available for the performance of another punching cycle.

It should be noted that the drive pins 24*a* and 24*b* are effectively disengaged from element 10 when the element is held in the latched position, the drive pins moving freely up and down in slot 26 without, in general, making contact with the ends of the slot. In some forms of the invention, however, the ascending drive pin, at the apex of the stroke, engages the latched element 10 for a short time to lift the element momentarily above member 28, thus facilitating easy removal or introduction of latch member 28 during each cycle of operation. It will be recognized, in view of the foregoing detailed description of the latching process, that engagement between element 10 and latch member 28 is made at a time when the element has very low velocity and that, therefore, a relatively light latch member may be used permitting high-speed operation thereof.

With reference now to Figs. 2*a*–2*d*, which show four side views of the record-impressing apparatus in Figs. 1*a*–1*b*, there is illustrated in more detail the punching operation of element 10 and its cooperation with drive pins 24*a* and 24*b*. Figs. 2*a*–2*c* show the apparatus as it would appear at three successive times during a single punching cycle, while Fig. 2*d* depicts the apparatus in its latched condition.

Fig. 2*a* illustrates the relative positions of the movable parts of the apparatus at a time shortly after element 10 has begun its downward punch stroke to punch a hole in a record card 29 which is being fed through the punch apparatus. It will be remembered that during the punch stroke, element 10 is compelled by spring 14 to follow the descending drive pin 24*b*. Fig. 2*b*, on the other hand, shows the apparatus at a time corresponding to the free rebound of the punch element from the platen supported record card. Fig. 2*c*, tn turn, illustrates the punch apparatus as it appears when the element has been lifted to the apex of its return stroke by the ascending drive pin, the punch element and the drive pins having momentarily zero velocities. It should be noted that the upper surface of latch member 28, which is not shown in Fig. 2*c*, would be slightly below the lower surface of flanged portion 31 of the punch element (see Fig. 1*a*), to provide for easy insertion of the latch member if desired. Referring to Fig. 2*d*, the apparatus is shown in its latched position, the element being held at its initial starting position by latch member 28 while the drive pins move freely in slot 26 without engaging the element. It will be recognized that in the series of drawings 2*a*–2*d*, the view shown in Fig. 2*b* corresponds in time to the view shown in Fig. 1*a*, while Fig. 2*d* corresponds to Fig. 1*b*.

A remarkably instructive graph depicting the position of elements 10 relative to the record throughout a single cycle of operation may be obtained by plotting the distance D separating the punching element from the platen as an ordinate against time, time being the abscissa. Such a graph is presented in Fig. 3. As shown in Fig. 3, the displacement D of element 10 is at a maximum at time $t=0$, which corresponds to the initial starting position, and drops in a curve which is substantially sinusoidal in form to zero at a time $T/2$, where T represents the total period of a single punch cycle. The interval following time $T/2$ corresponds to the return stroke of the element which rises again to a maximum displacement at time T. In the curve shown in Fig. 3 it is assumed that the element is latched at time T, the displacement D of the element thereafter remaining constant until the latch is again released. In Fig. 3 solid lines in the plot of D express that for the indicated time periods the element 10 is in contact with a drive pin while broken lines indicate that the element is disengaged from the drive pins. It is clear that the point of slight inflection in the curve, which is designated as E, corresponds to the gentle, low-velocity engagement of the ascending drive pin with the element during the return stroke.

Referring now to Fig. 4*a*, there is shown a modified form of the invention in which the drive mechanism utilizes a single rotatable cam 30 of appropriate shape for performing the same major functions as are performed by the two drive pins utilized in the embodiment of the invention hereinbefore described. Another modification employed in the embodiment of Fig. 4*a* is the use of a leaf or cantilever type of spring 14*a* which is fastened at both ends, one end being fastened to a frame member 70 and the other end being fastened to element 10*a*. Spring 14*a* flexes easily in one plane at right angles to the spring plane, but has great resistance to flexure in other planes, the spring thereby not only performing the functions hereinbefore described, but also functioning to position anl align element 10*a* in its path of motion.

The apparatus of Fig. 4*a* is shown as it would appear at the time that element 10*a* is starting its rebound from platen 12. Element 10*a*, as shown in Fig. 4*a*, is a printing hammer driven against platen 12 by spring 14*a*. It will be understood by those skilled in the art that element 10*a* may carry raised type letters on its bottom face, or may have a smooth bottom face which is used in pressing an intervening record medium against raised type letters carried on platen 12. In the latter type of operation, platen 12 may be a portion of a rotatable type wheel or drum.

As shown in Fig. 4*a*, the printing apparatus includes a latch member 28*a*, which is actuable by an electrical signal-responsive actuating device, generally designated 32, the actuating device comprising an electromagnet which withdraws element 28*a* from engagement with element 10*a* whenever an electrical signal is applied to a magentizing coil 34 of the electromagnet. In the absence of an applied electrical signal, latch member 28*a* is urged forward by a leaf spring 27 to press lightly against an adjacent face 36 of element 10*a*, the latch member then engaging a notch 38 in element 10*a* whenever element 10 rises to the apex of its return stroke. Thus, if it is desired to suppress a printing cycle, the applied electrical signal may be removed at almost any time during the preceding cycle without in any way affecting that cycle, the indicated latching operation only taking place at the completion of the preceding cycle of operation.

The operation of the cam-driven apparatus shown in Fig. 4*a* is basically the same as the operation of the crank-driven apparatus shown in Figs. 1*a*–1*b* and Figs. 2*a*–2*d*. In operation, element 10*a* is compelled by spring 14*a* to follow cam 30 throughout the printing stroke, the velocity and timing of the descending element 10*a* therefore being regulated by drive cam 30 during the printing stroke. At the completion of the printing stroke, element 10*a* has a free rebound from the platen, springing upwards for at least a portion of the return stroke, the element being overtaken by cam 30 at some time during the return stroke, as shown in Fig. 4*b*, to be lifted by the cam to the predetermined starting position.

The printing apparatus shown in Figs. 4*a* and 4*b* may readily be modified or varied in its design by the substitution for cam 30 of various other differently shaped cams in accordance with the invention. For example, cam 30*a*, which as shown in Fig. 5*a* is mounted on shaft 18, or the pair of eccentrics 30*b* shown in Fig. 5*b*, may be directly substituted for cam 30 in the embodiment of Figs. 4*a* and 4*b*. With the substitution of cam 30*a*, a modified mode of operation is obtained for the printing apparatus in which element 10*a* does not contact the drive throughout the printing stroke, the timing and synchronization of the rebound being obtained by choosing the physical constants of spring 14*a* and element 10*a* so that the element vibrates at a frequency closely matching the frequency of operation of the drive mechanism. It will be recognized by those skilled in the mechanical arts that the natural vibration or printing frequency of the vibratable mechanical system, which comprises spring 14*a*, element 10*a*, and platen 12, is approximately given by the following formula:

$$f=\frac{1}{\pi}\sqrt{\frac{k}{m}}$$

where $k$ is the elastic spring constant of spring 14*a* and $m$ is the mass of element 10*a*. Since a single printing operation of element 10*a* accords with a half revolution of the drive cam, it is clear that for optimum synchronization of the rebound with the cyclic operation of the drive mechanism, the revolution rate $r$ of shaft 18 should be equal to one-half the natural printing frequency $f$.

While it is evident that close frequency matching of the above-described type is desirable in connection with the use of cam 30*a*, it is also evident that considerably greater departures from exact frequency matching are acceptable in connection with those embodiments of the invention hereinbefore described in which the descent of the impression element during the impression stroke is timed and regulated by the drive mechanism. Accordingly, regulation of the impression stroke by the drive mechanism is considered preferable. However, even in those embodiments of the invention wherein the impression stroke is regulated by the drive mechanism, such as the embodiments of Figs. 1*a* and 4*a*, it is desirable to attain reasonably close frequency matching in order to present unnecessary wear on the drive mechanism and increased energy requirements from the source energizing the drive mechanism.

The self-regulating feature of operation is retained if the pair of eccentrics 30*b*, shown in Figs. 5*b*, is substituted for cam 30 in the embodiment of Figs. 4*a* and 4*b*. The eccentrics are positioned 180° out of phase with respect to one another on shaft 18, substantially as shown. In operation, the printing element follows one of the eccentrics during the printing stroke and is lifted by the other eccentric during the return stroke of the printing element, the entire cycle of operation of the apparatus being essentially identical to that obtained with cam 30. However, the use of the pair of eccentrics offers certain advantages in that the circular eccentrics 30*b* are less expensive and more easily fabricated than cam 30. The circular shape of the eccentrics also allows the use of conventional ball-bearing races for the operating surface of the eccentrics, therefore greatly decreasing the effects of frictional wear as the eccentrics wipe across the contacting surface of element 10*a*.

It will be recognized by those skilled in the art that a plurality of printing apparatus of the type shown in Fig. 4*a* may be readily combined in an array to provide for either parallel or serial printing operations. For example, such an array may be readily constructed by arranging a plurality of cams, identical to cam 30, in succession along shaft 18, each cam engaging a corresponding printing element positioned adjacent the cam, and each printing element being operable under the control of an associated independently operable signal-responsive latching device. Parallel or serial phasing of the operations of the successive printing elements may, of course, be obtained by appropriate phasing or variance of the rotational position of the corresponding cams. A single extended cam of appropriate shape may also be used to replace the described plurality of cams.

The crank-driven embodiment of the invention shown in Figs. 1*a*–1*b* and Figs. 2*a*–2*d* is also readily adaptable for use in large arrays of impression elements to provide either parallel or serial record impressing operations. Referring now to Figs. 6*a* and 6*b*, there are shown front and side views, respectively, of an array which includes a plurality of punch elements 10 driven by a common pair of rocker bars 34*a* and 34*b* inserted through rectangular window slot 26 in the punch bodies. Each rocker bar is driven by a crank at each end, rocker bar 34*a* being driven by a pair of cranks 60*a* and 62*a*, while rocker bar 34*b* is driven by a pair of cranks 60*b* and 62*b*. The two cranks 60*a* and 60*b* are driven in 180° phase opposition with respect to each other by respectively associated eccentrics mounted on a common drive shaft 66, a 180° phase difference also being maintained between the motions of cranks 62*a* and 62*b*, which are driven from a second drive shaft 68. As sown in Figs. 6*a* and 6*b*, the motions of the two cranks associated with a rocker arm are in phase synchronism with each other. Consequently, in operation the rocker arms remain horizontal while moving up and down with sinusoidal reciprocating motions. It is clear, therefore, that in operation all of the punch elements may be actuated simultaneously, resulting in parallel synchronized operation of the punch elements.

It will be recognized, however, that if a suitable phase difference is maintained between the motions of the two cranks associated with a rocker bar, then the rocker bar will tilt back and forth in operation, resulting in a serial or galloping operation of the punch elements. It is obvious, of course, that if more punch elements are required than can be driven by a single pair of rocker arms, additional arrays of punch elements similar to the array shown in Fig. 6*a* may be added, these additional arrays also being driven by the same pair of drive shafts 66 and 68.

It should be understood, of course, that the foregoing disclosure relates only to preferred embodiments of the invention and that numerous modifications or alterations may be made therein without departing from the spirit and scope of the invention as set forth in the appended claims.

What is claimed as new is:

1. A record-impressing apparatus comprising: a vibratable mechanical system, said system including a platen having a surface for supporting a record thereon, an impression element initially held in a starting position at a predetermined distance from said platen and driveable toward said platen in an impression stroke against the surface of said platen, said element upon striking said surface elastically rebounding away from said surface for the performance of a return stroke, a spring coupled to said element and tensioned during said impression stroke for applying an accelerating force to said element to drive said element against said platen, the force being directed toward said surface and being proportional to the distance between said element and the surface of said platen; and a mechanical drive for supplying additional energy to said mechanical system to replace energy lost by said system during said elastic rebound, said drive including mechanism cooperating with said element for applying a lifting force, directed away from said surface, to said element during the return stroke to return said element to said starting position, whereby said additional energy is transferred from said mechanism to said element to supplement the kinetic energy retained by said element after said elastic rebound.

2. The record-impressing apparatus defined by claim 1 wherein said spring is maximally deflected when said element is at said starting position for applying maximum accelerating force to said element, and substantially undeflected when said element strikes against the surface of said platen for minimally opposing said elastic rebound.

3. The record-impressing apparatus defined by claim 1 wherein said mechanism for applying a lifting force to said element during the return stroke also includes means for timing and regulating the speed of said element during the impression stroke in accordance with a predetermined schedule of speeds, said means engaging said element during the impression stroke to apply a restraining force thereto for timing and regulating the speed thereof.

4. A record-impressing apparatus comprising: a vibratable mechanical system, said system including a platen having a surface for supporting a record thereon, an impression element, said element being driveable from a predetermined starting position toward said platen in an impression stroke against the surface of said platen, said element upon striking said surface being elastically reboundable away from said surface for the performance of a return stroke, a spring coupled to said element for driving said element in the impression stroke against said platen, said spring driving said element in such a manner that the acceleration of said element is a maximum when said element is at said predetermined starting position and substantially zero when said element strikes against said platen; and a mechanical drive for supplying additional energy to said mechanical system to replace energy lost by said system, said drive including mechanism cooperating with said element for applying a lifting force, directed away from said surface, to said element during the return stroke to return said element to said predetermined starting position, said mechanism thereby transferring additional energy to said element to supplement the kinetic energy retained by said element after the elastic rebound of said element from the surface of said platen.

5. A record-impressing apparatus comprising: a vibratable mechanical system, said system including a platen having a surface for supporting a record thereon, an impression element initially held in a starting position at a predetermined distance from said platen and driveable toward said platen in an impression stroke against the surface of said platen, said element upon striking said surface being elastically reboundable away from said surface for the performance of a return stroke, a spring coupled to said element for applying an accelerating force to said element to drive said element in the impression stroke against said platen, the accelerating force being directed toward said surface and being proportional to the distance between the element and the surface of said platen, and a mechanical drive for regulating the motion of said element during its impression and return strokes, said drive including a mechanism cooperating with said element for varying the speed of said element during its impression stroke in such a manner that the speed at any instant substantially corresponds to the speed of a spring-suspended mass undergoing free vibrations in accordance with the elastic rebound cycle of the spring and for lifting said element during a portion of its return stroke to return said element to said starting position, thereby to replace energy lost by said system.

6. A record-impressing apparatus comprising: a platen having a surface for supporting a record thereon; a record impressing element driveable from a predetermined starting position for motion in a predetermined first path in an impression stroke against the surface of said platen, said element upon striking said surface being elastically reboundable away from said surface for the performance of a return stroke in said first path; a spring coupled to said element and in compression during the impression stroke for applying an accelerating force to said element directed toward the surface of said platen, the accelerating force applied by said spring being proportional to the deflection of said spring, said spring being maximally deflected when said element is at said predetermined starting position and being substantially undeflected when said element strikes against said surface; and a mechanical drive for engaging said element during predetermined portions of its impression and return strokes to apply a regulating force to said element that is at all times directed away from the surface of said platen, said force regulating the velocity of said element in accordance with a predetermined schedule of velocities, the schedule of velocities being representative of the successive velocities of a mass undergoing free vibrations in accordance with the elastic rebound cycle.

7. The record-impressing apparatus defined by claim 6 wherein said drive comprises a rotating shaft, a pair of eccentrics mounted on said shaft and positioned 180° out of phase with one another, one eccentric of said pair being coupled to said element during an impression stroke for applying said regulating force during said impression stroke and the other eccentric of said pair being coupled to said element during the following return stroke for applying said regulating force during said return stroke.

8. The record-impressing apparatus defined by claim 6 wherein said drive includes first and second drive pins, each pin being movable in a separate drive path parallel to said first space path, and wherein said drive also includes means for moving said pins along their respective drive paths for the performance of equal amplitude simple harmonic reciprocating motions, the reciprocating motion of the first drive pin being in 180° phase opposition to the reciprocating motion of said second drive pin, said first pin descending toward the surface of said platen when said second pin ascends away from said surface; and wherein said spring constrains said element to remain in engagement with whichever pin is most remote from said platen.

9. A record-impressing apparatus comprising: a platen having a surface for supporting a record thereon; an impression element initially having a position corresponding to a predetermined amount of potential energy relative to said platen; and means coupled to said element for completely converting the potential energy of said element relative to said platen to kinetic energy at a predetermined rate during a first interval of time, whereby said element is brought into impact with the surface of said platen, said platen and said means cooperating to completely convert the kinetic energy of said element to potential energy at said predetermined rate during a second interval of time following and equal to said first interval of time, said means including supplementary means for supplying additional potential energy to said element equal to energy lost during said impact, whereby said element is returned to said position corresponding to said initial level of potential energy.

(References on following page)

References Cited in the file of this patent

UNITED STATES PATENTS

| | | |
|---|---|---|
| 923,085 | Smith | May 25, 1909 |
| 1,333,308 | Harris | Mar. 9, 1920 |
| 1,359,807 | Huber | Nov. 23, 1920 |
| 1,675,969 | Bull | July 3, 1928 |
| 1,688,552 | Nobs | Oct. 23, 1928 |
| 1,716,699 | Kirkegaard | June 11, 1929 |
| 1,860,729 | Braund | May 31, 1932 |
| 2,227,143 | Knutsen | Dec. 31, 1940 |
| 2,245,879 | Sossner | June 17, 1941 |
| 2,427,358 | Kowach | Sept. 16, 1947 |
| 2,687,088 | Hennessy | Aug. 24, 1954 |

FOREIGN PATENTS

| | | |
|---|---|---|
| 118,698 | Great Britain | Sept. 12, 1918 |